US010640856B2

(12) United States Patent
Yuga et al.

(10) Patent No.: US 10,640,856 B2
(45) Date of Patent: *May 5, 2020

(54) HIGH-STRENGTH SEAMLESS STEEL PIPE FOR OIL COUNTRY TUBULAR GOODS AND METHOD OF PRODUCING THE SAME

(71) Applicant: JFE STEEL CORPORATION, Tokyo (JP)

(72) Inventors: Masao Yuga, Handa (JP); Yasuhide Ishiguro, Handa (JP); Mitsuhiro Okatsu, Handa (JP); Kazuki Fujimura, Handa (JP)

(73) Assignee: JFE Steel Corporation, Tokyo (JP)

( * ) Notice: Subject to any disclaimer, the term of this patent is extended or adjusted under 35 U.S.C. 154(b) by 393 days.

This patent is subject to a terminal disclaimer.

(21) Appl. No.: 15/509,350

(22) PCT Filed: Aug. 20, 2015

(86) PCT No.: PCT/JP2015/004181
§ 371 (c)(1),
(2) Date: Mar. 7, 2017

(87) PCT Pub. No.: WO2016/038810
PCT Pub. Date: Mar. 17, 2016

(65) Prior Publication Data
US 2017/0283918 A1    Oct. 5, 2017

(30) Foreign Application Priority Data

Sep. 8, 2014   (JP) ................. 2014-182044

(51) Int. Cl.
*C22C 38/12* (2006.01)
*C22C 38/04* (2006.01)
*C22C 38/06* (2006.01)
*C22C 38/18* (2006.01)
*C21D 8/10* (2006.01)
*C21D 9/08* (2006.01)
*C22C 38/32* (2006.01)
*C22C 38/26* (2006.01)
*C22C 38/24* (2006.01)
*C22C 38/22* (2006.01)
*C22C 38/00* (2006.01)
*C22C 38/02* (2006.01)
*F16L 9/02* (2006.01)

(52) U.S. Cl.
CPC .............. *C22C 38/12* (2013.01); *C21D 8/105* (2013.01); *C21D 9/085* (2013.01); *C22C 38/001* (2013.01); *C22C 38/02* (2013.01); *C22C 38/04* (2013.01); *C22C 38/06* (2013.01); *C22C 38/18* (2013.01); *C22C 38/22* (2013.01); *C22C 38/24* (2013.01); *C22C 38/26* (2013.01); *C22C 38/32* (2013.01); *F16L 9/02* (2013.01); *C21D 2211/008* (2013.01)

(58) Field of Classification Search
None
See application file for complete search history.

(56) References Cited

U.S. PATENT DOCUMENTS

| 4,075,041 | A | 2/1978 | Ueno et al. |
| 6,267,828 | B1 | 7/2001 | Kushida et al. |
| 7,670,547 | B2 | 3/2010 | Kobayashi et al. |
| 9,234,524 | B2 | 1/2016 | Eguchi et al. |
| 9,708,681 | B2* | 7/2017 | Eguchi .............. C21D 8/10 |
| 2004/0238075 | A1 | 12/2004 | Kondo |
| 2008/0219878 | A1 | 9/2008 | Kondo et al. |
| 2012/0186704 | A1 | 7/2012 | Eguchi et al. |
| 2014/0352836 | A1* | 12/2014 | Eguchi .............. C21D 8/10 138/177 |
| 2015/0041030 | A1 | 2/2015 | Kondo et al. |
| 2015/0114527 | A1 | 4/2015 | Omura et al. |
| 2017/0275715 | A1* | 9/2017 | Yuga .............. C22C 38/00 |
| 2017/0349963 | A1* | 12/2017 | Yuga .............. C21D 8/10 |
| 2017/0349964 | A1* | 12/2017 | Yuga .............. C21D 8/10 |
| 2018/0327881 | A1* | 11/2018 | Yuga .............. C21D 8/10 |
| 2019/0024201 | A1* | 1/2019 | Yuga .............. C22C 38/32 |

FOREIGN PATENT DOCUMENTS

| CA | 2766028 | 12/2010 |
| CN | 102459677 A | 5/2012 |
| CN | 104011251 A | 8/2014 |

(Continued)

OTHER PUBLICATIONS

European Communication PUrsuant to Article 94(3) for European Application No. 15839926.1, dated Aug. 16, 2018, 6 pages.
Non Final Office Action for U.S. Appl. No. 15/509,361, dated Feb. 25, 2019, 20 pages.
Supplementary European Search Report for Application No. 15839926.1, dated Jul. 3, 2017, 10 pages.
International Search Report and Written Opinion for International Application No. PCT/JP2015/004181, dated Nov. 17, 2015, 5 pages.
Chinese Office Action with Concise Statement of Relevance of Office Action for Chinese Application No. 201580048255.8, dated Dec. 5, 2017, 9 pages.
Non Final Office Action for U.S. Appl. No. 15/527,893, dated Jun. 24, 2019, 28 pages.

(Continued)

*Primary Examiner* — Xiaowei Su
(74) *Attorney, Agent, or Firm* — RatnerPrestia

(57) ABSTRACT

Provided is a high-strength seamless steel pipe having the composition which contains, by mass %, 0.20 to 0.50% C, 0.05 to 0.40% Si, 0.3 to 0.9% Mn, 0.015% or less P, 0.005% or less S, 0.005 to 0.1% Al, 0.008% or less N, more than 0.6% and 1.7% or less Cr, more than 1.0% and 3.0% or less Mo, 0.01 to 0.30% V, 0.001% or more and less than 0.01% Nb, 0.0003 to 0.0030% B, and 0.0030% or less O (oxygen). The high-strength seamless steel pipe has the microstructure where a volume fraction of a tempered martensitic phase is 95% or more, and prior austenitic grains have a grain size number of 8.5 or more, and a segregation degree index Ps which is defined by a formula Ps=8.1 $(X_{Si}+X_{Mn}+X_{Mo})$+ $1.2X_P$ is set to less than 65.

16 Claims, No Drawings

(56) References Cited

FOREIGN PATENT DOCUMENTS

| | | | |
|---|---|---|---|
| EP | 2796587 A1 | 10/2014 | |
| JP | S5794409 A | 6/1982 | |
| JP | S5897409 A | 6/1983 | |
| JP | S619519 A | 1/1986 | |
| JP | 2000178682 A | 6/2000 | |
| JP | 2000297344 A | 10/2000 | |
| JP | 2001172739 A | 6/2001 | |
| JP | 2007016291 A | 1/2007 | |
| JP | 2013227611 A | 11/2013 | |
| JP | 2014012890 A | 1/2014 | |
| RU | 2210604 C2 | 8/2003 | |
| WO | 2010150915 A1 | 12/2010 | |
| WO | 2013094179 A1 | 6/2013 | |
| WO | WO-2013094179 A1 * | 6/2013 | ............... C21D 8/10 |
| WO | 2013133076 A1 | 9/2013 | |
| WO | 2013191131 A1 | 12/2013 | |

OTHER PUBLICATIONS

Non Final Office Action for U.S. Appl. No. 14/366,545, dated May 10, 2016, 9 pages.

Final Office Action for U.S. Appl. No. 14/366,545, dated Nov. 16, 2016, 8 pages.

Restriction Requirement for U.S. Appl. No. 15/527,893, dated Jan. 28, 2019, 7 pages.

Non Final Office Action for U.S. Appl. No. 15/537,669, dated Oct. 30, 2019, 12 pages.

Non Final Office Action for U.S. Appl. No. 15/537,703, dated Oct. 30, 2019, 11 pages.

* cited by examiner

HIGH-STRENGTH SEAMLESS STEEL PIPE FOR OIL COUNTRY TUBULAR GOODS AND METHOD OF PRODUCING THE SAME

CROSS REFERENCE TO RELATED APPLICATIONS

This is the U.S. National Phase application of PCT International Application No. PCT/JP2015/004181, filed Aug. 20, 2015, and claims priority to Japanese Patent Application No. 2014-182044, filed Sep. 8, 2014, the disclosures of each of these applications being incorporated herein by reference in their entireties for all purposes.

FIELD OF THE INVENTION

The present invention relates to a seamless steel pipe preferably used as oil country tubular goods, a line pipe or the like, and more particularly to a high-strength seamless steel pipe which exhibits excellent sulfide stress corrosion cracking resistance (SSC resistance) in a wet hydrogen sulfide environment (sour environment) and a method of producing the same.

BACKGROUND OF THE INVENTION

Recently, from a viewpoint of securing a stable energy resource, the development of oil wells or natural gas fields having a high depth in a severely corrosive environment has been in progress. To realize such development, oil country tubular goods and a line pipe for transportation are strongly required excellent SSC resistance in a sour environment a yield strength YS of 125 ksi or more.

To satisfy such a demand, for example, in Patent Literature 1, there has been proposed a method of manufacturing steel for an oil country tubular goods where low alloy steel containing, by weight %, 0.2 to 0.35% C, 0.2 to 0.7% Cr, 0.1 to 0.5% Mo, 0.1 to 0.3% V, and further containing C, Cr, Mo and V in an adjusted manner is quenched at an $Ac_3$ transformation temperature or above and, thereafter, is tempered at a temperature of 650° C. or above and an $Ac_1$ transformation temperature or below. With the use of a technique described in Patent Literature 1, the composition of the steel for an oil country tubular goods can be adjusted such that a total amount of precipitated carbide is 2 to 5 weight %, a rate of MC type carbide among a total amount of carbide becomes 8 to 40 weight % thereby producing a steel for an oil country tubular goods having excellent sulfide stress corrosion cracking resistance.

In Patent Literature 2, there has been proposed a method of manufacturing steel for an oil country tubular goods having excellent toughness and sulfide stress corrosion cracking resistance where low alloy steel containing, by mass %, 0.15 to 0.3% C, 0.2 to 1.5% Cr, 0.1 to 1% Mo, 0.05 to 0.3% V and 0.003 to 0.1% Nb is processed by hot working being finished at 1000° C. or above after the low alloy steel is heated to 1150° C. or above, subsequently is quenched from a temperature of 900° C. or above and, thereafter, is tempered at 550° C. or above and $Ac_1$ transformation temperature or below and, further, quenching and tempering treatment where the low alloy steel is reheated to a temperature of 850 to 1000° C., is quenched, and is tempered at 650° C. or above and an $Ac_1$ transformation temperature or below is performed at least one time. With the use of the technique described in Patent Literature 2, the composition of the steel for an oil country tubular goods can be adjusted such that a total amount of precipitated carbide is 1.5 to 4 mass %, and a rate of MC type carbide out of a total carbide amount is 5 to 45 mass %, and a rate of $M_{23}C_6$ type carbide is 200/t (t: wall thickness (mm)) mass % or below thus manufacturing steel for an oil country tubular goods having excellent toughness and excellent sulfide stress corrosion cracking resistance.

In Patent Literature 3, there has been proposed a steel material for an oil country tubular goods containing, by mass %, 0.15 to 0.30% C, 0.05 to 1.0% Si, 0.10 to 1.0% Mn, 0.1 to 1.5% Cr, 0.1 to 1.0% Mo, 0.003 to 0.08% Al, 0.008% or less N, 0.0005 to 0.010% B, 0.008% or less Ca+O, and further containing one kind or two kinds or more of elements selected from a group consisting of 0.005 to 0.05% Ti, 0.05% or less Nb, 0.05% or less Zr, and 0.30% or less V, wherein a maximum length of a continuous non-metal inclusion by cross-sectional observation is 80 μm or less, and the number of non-metal inclusions having a grain size of 20 μm or more by cross-sectional observation is 10 pieces/100 mm² or less. With the use of such a steel material for an oil country tubular goods, it is said that a low alloy steel material for an oil country tubular goods having high strength required for an oil country tubular goods use and having excellent SSC resistance which corresponds to such a strength can be acquired.

In Patent Literature 4, there has been proposed a low alloy steel for oil country tubular goods having excellent sulfide stress corrosion cracking resistance containing, by mass %, 0.20 to 0.35% C, 0.05 to 0.5% Si, 0.05 to 0.6% Mn, 0.025% or less P, 0.01% or less S, 0.005 to 0.100% Al, 0.8 to 3.0% Mo, 0.05 to 0.25% V, 0.0001 to 0.005% B, 0.01% or less N, and 0.01% or less O, wherein the relationship of 12V+1−Mo≥0 is satisfied. In the technique described in Patent Literature 4, in addition to the above-mentioned composition, the low alloy steel for oil country tubular goods may further contain 0.6% or less Cr to the extent that the relationship of Mo−(Cr+Mn)≥0 is satisfied, and the low alloy steel for oil country tubular goods may further contain one kind or more of elements selected from a group consisting of 0.1% or less Nb, 0.1% or less Ti, 0.1% or less Zr. The low alloy steel for oil country tubular goods may further contain 0.01% or less Ca.

Patent Literature

Patent Literature 1: Japanese Unexamined Patent Application Publication No. 2000-178682
Patent Literature 2: Japanese Unexamined Patent Application Publication No. 2000-297344
Patent Literature 3: Japanese Unexamined Patent Application Publication No. 2001-172739
Patent Literature 4: Japanese Unexamined Patent Application Publication No. 2007-16291

SUMMARY OF THE INVENTION

However, as factors which influence the sulfide stress corrosion cracking resistance (SSC resistance), various factors are considered. Accordingly, the use of only the techniques described in Patent Literatures 1 to 4 is not considered sufficient as the technique for improving the SSC resistance of a high-strength seamless steel pipe having YS of 125 ksi class or above to a level sufficient for oil well use used under a severely corrosive environment. There also exists a drawback that it is extremely difficult to adjust kinds and amounts of carbides described in Patent Literatures 1 and 2 and a shape and the number of non-metal inclusions described in Patent Literature 3 within desired ranges in a stable manner.

Aspects of the present invention have been made to overcome such drawbacks of the conventional art, and it is an object of aspects of the present invention to provide a high-strength seamless steel pipe for an oil country tubular goods having excellent sulfide stress corrosion cracking resistance (SSC resistance) and a method of manufacturing the same.

In this specification, "high-strength" means a case where the steel has a yield strength YS of 125 ksi class or more, that is, a yield strength YS of 862 MPa or more. In addition, "excellent SSC resistance" described herein means a case where no cracking occurs with an applied stress of 85% of the yield strength of a specimen over 720 hours when a constant-load test is performed in an solution of acetic acid-sodium acetate (liquid temperature: 24° C.) saturated with hydrogen sulfide at 10 kPa, having an adjusted pH of 3.5, and containing an aqueous solution of 5.0 mass % of sodium chloride according to a test method stipulated in NACE TMO177 Method A.

In view of the fact that it is necessary for a steel pipe to acquire both desired high strength and excellent SSC resistance to achieve the above-mentioned object, inventors of the present invention have extensively studied various factors which influence a strength and SSC resistance of the steel pipe. As a result, the inventors have found that it is important for a high-strength seamless steel pipe for an oil country tubular goods to suppress the center segregation and the micro segregation in order to obtain excellent SSC resistance.

The inventors of the present invention have focused on the difference in influence exerted on SSC resistance when the center segregation or the micro segregation occurs with respect to respective alloy elements, have selected elements exerting a strong influence, and have devised a segregation index Ps value which is defined by the following formula (1) having coefficients determined by taking into account magnitudes of influences that the respective elements have sensitivity of respective elements.

$$Ps=8.1\ (X_{Si}+X_{Mn}+X_{Mo})+1.2X_P \quad (1)$$

(Here, $X_M$: (segregated portion content (mass %))/(average content (mass %)) of the element M). Along with the increase in the Ps value, locally hardened regions are increased. These locally hardened regions accelerate the propagation of cracks thus deteriorating SSC resistance. In view of the above, to enhance the SSC resistance, it is important to suppress the generation of locally hardened regions. The inventors have found that when the Ps value is set to less than 65, the generation of locally hardened regions is suppressed and the SSC resistance is remarkably enhanced.

Here, $X_M$ is (segregated portion content (mass %))/(average content (mass %)) of the element M. M indicates respective elements Si, Mn, Mo, and P.

$X_M$ is a value obtained as follows.

In a square region having sizes of 5 mm×5 mm and having the center thereof at a position ¼ t (t: wall thickness) from an inner surface of a seamless steel pipe, an area analysis is performed in at least three fields of view with respect to an element M (Si, Mn, Mo, P) under a condition of 0.1 seconds per one point with a step of 20 μm by an electron prove micro analyzer (EPMA) using a beam having a diameter of 20 μm. All acquired concentration values are arranged in descending order of concentration, and the content which corresponds to cumulative occurrence frequency of 0.0001 is obtained, and the content is set as a segregated portion content of the element. To be more specific, the measured values in all fields of view are collected and are arranged in descending order of concentration, and measurement points×0.0001th value (when the value is not an integer, an integer value larger than this value and closest to the value) is set as a segregated portion content. On the other hand, the content of each element is set as an average content of the element based on the composition (representative value) of each seamless steel pipe, and a ratio between the segregated portion concentration and the average concentration is obtained for every element, and the ratio is set as $X_M$. That is, $X_M$=(segregated portion content of element M)/(average content of element M).

Aspects of the present invention have been completed based on such finding as well as further studies added to the finding. That is, aspects of the present invention are as follows.

(1) A high-strength seamless steel pipe for an oil country tubular goods having the composition which contains, by mass %, 0.20 to 0.50% C, 0.05 to 0.40% Si, 0.3 to 0.9% Mn, 0.015% or less P, 0.005% or less S, 0.005 to 0.1% Al, 0.008% or less N, more than 0.6% and 1.7% or less Cr, more than 1.0% and 3.0% or less Mo, 0.01 to 0.30% V, 0.001% or more and less than 0.01% Nb, 0.0003 to 0.0030% B, 0.0030% or less O (oxygen), and Fe and unavoidable impurities as a balance, wherein the steel pipe has the microstructure where a volume fraction of a tempered martensitic phase is 95% or more, and prior austenitic grains have a grain size number of 8.5 or more, and a segregation degree index Ps which is defined by a following formula (1) using $X_M$ which is a ratio between a segregated portion content obtained by performing an area analysis of respective elements by an electron prove micro analyzer (EPMA) in a region having the center thereof positioned at ¼ t (t: wall thickness) from an inner surface of the steel pipe and an average content is set to less than 65, and a yield strength YS is 862 MPa or more.

$$Ps=8.1\ (X_{Si}+X_{Mn}+X_{Mo})+1.2X_P \quad (1)$$

(Here, $X_M$: (segregated portion content (mass %) of element M)/(average content (mass %) of element M)

(2) In the high-strength seamless steel pipe for an oil country tubular goods having the constitution (1), the composition further contains, by mass %, 0.005% to 0.030% Ti, such that a Ti/N which is a ratio between the content of Ti and the content of N satisfies a value which falls within a range of 2.0 to 5.0.

(3) In the high-strength seamless steel pipe for an oil country tubular goods having the constitution (1) or (2), the composition further contains one kind or two kinds or more of elements selected from a group consisting of, by mass %, 1.0% or less Cu, 1.0% or less Ni, and 3.0% or less W.

(4) In the high-strength seamless steel pipe for an oil country tubular goods having any one of the constitutions (1) to (3), the composition further contains 0.0005 to 0.005% Ca.

(5) A method of manufacturing a high-strength seamless steel pipe for an oil country tubular goods which is a method of manufacturing a seamless steel pipe having a predetermined shape by applying heating and hot working to a steel pipe material, and which is a method of manufacturing the high-strength seamless steel pipe for an oil country tubular goods having any one of the constitutions (1) to (4), wherein a heating temperature in the heating is set to a temperature which falls within a range of 1050 to 1350° C., cooling after the hot working is performed until a surface temperature becomes a temperature equal to or below 200° C. at a cooling rate equal to or higher than air cooling and, after the cooling, quenching treatment in which the steel pipe is reheated at a temperature which falls within a range of $A_{C3}$ transformation temperature or above to 1000° C. or below and the steel pipe is rapidly cooled to a temperature such that a surface temperature becomes 200° C. or below is performed one time or more, and after the quenching treatment, tempering treatment which heats the steel pipe to a temperature which falls within a range of 600 to 740° C. is performed.

According to aspects of the present invention, a high-strength seamless steel pipe for an oil country tubular goods having a yield strength YS of 862 MPa (125 ksi) or more and having excellent sulfide stress corrosion cracking resistance can be manufactured easily at a low cost and hence, aspects of the present invention can acquire the industrially remarkable advantageous effects. Further, according to aspects of the present invention, by allowing the steel pipe to contain proper amounts of proper alloy elements, it is possible to manufacture a high-strength seamless steel pipe having both desired high strength and excellent SSC resistance required when used as a seamless steel pipe for an oil country tubular goods.

DETAILED DESCRIPTION OF EMBODIMENTS OF THE INVENTION

Firstly, the reasons for limiting the contents of respective constitutional elements of the high-strength seamless steel pipe according to aspects of the present invention are explained. Unless otherwise specified, mass % in the composition is simply indicated by "%" hereinafter.

C: 0.20 to 0.50%

C contributes to the increase in strength of steel by becoming in steel in a solid solution state in steel, enhances a hardenability of steel, and contributes to the formation of microstructure having a martensitic phase as a main phase at the time of quenching. To enable the steel pipe to acquire such an effect, the content of C needs to be 0.20% or more. On the other hand, when the content of C exceeds 0.50%, cracks occur at the time of quenching thus extremely deteriorating manufacturability. Accordingly, C is limited in a range of 0.20 to 0.50%, is preferably 0.20 to 0.35%, and is more preferably 0.22 to 0.32%.

Si: 0.05 to 0.40%

Si is an element which functions as a deoxidizing agent and has a function of increasing strength of steel by becoming in a solid solution state in steel and suppressing softening of steel at the time of tempering. To enable the steel pipe to acquire such an effect, the content of Si needs to be 0.05% or more. On the other hand, when the content of Si is large and exceeds 0.40%, the generation of a ferrite phase which is a softening phase is accelerated thus preventing a desired high steel strengthening effect, or accelerating the formation of coarse oxide-based inclusions thus deteriorating SSC resistance and toughness. Further, Si is an element which is segregated and locally hardens steel. Accordingly, the large content of Si gives rise to an adverse effect where a locally hardened region is formed so that SSC resistance is deteriorated. Accordingly, in accordance with aspects of the present invention, Si is limited in a range of 0.05 to 0.40%, is preferably 0.05 to 0.30%, and is more preferably 0.20 to 0.30%.

Mn: 0.3 to 0.9%

In the same manner as C, Mn is an element which enhances a hardenability of steel and contributes to the increase in strength of steel. To acquire such an effect, the content of Mn needs to be 0.3% or more. On the other hand, Mn is an element which is segregated and locally hardens steel. Accordingly, the large content of Mn gives rise to an adverse effect where a locally hardened region is formed so that SSC resistance is deteriorated. Accordingly, in accordance with aspects of the present invention, Mn is limited in a range of 0.3 to 0.9%, is preferably 0.4 to 0.8%, and is more preferably 0.5 to 0.8%.

P: 0.015% or Less

P is an element which not only induces grain boundary embrittlement due to grain boundary segregation but also locally hardens steel due to its segregation. In accordance with aspects of the present invention, although it is preferable to decrease the content of P as much as possible as an unavoidable impurity, the presence of P up to 0.015% is permissible. Accordingly, P is limited to 0.015% or less, and is preferably 0.012% or less.

S: 0.005% or Less

S is present as an unavoidable impurity, and most of S is present in steel as sulfide-based inclusions and deteriorates ductility, toughness and SSC resistance. Accordingly, although it is preferable to decrease the content of S as much as possible, the presence of S up to 0.005% is permissible. Accordingly, S is limited to 0.0050 or less, and is preferably 0.003% or less.

Al: 0.005 to 0.1%

Al functions as a deoxidizing agent and is added for deoxidizing molten steel. Further, Al forms AlN by being bonded with N, contributes to making austenite grains fine at the time of heating and suppresses deterioration of q-hardenability enhancing effect of B by preventing a solid solution B from being bonded with N. To acquire such an effect, the content of Al needs to be 0.005% or more. However, the content of Al exceeding 0.1% brings about increase in oxide-based inclusions and deteriorates cleanliness of steel thus inducing the deterioration of ductility, toughness and SSC resistance. Accordingly, Al is limited in a range of 0.005 to 0.1%, is preferably 0.01 to 0.08%, and is more preferably 0.02 to 0.05%.

N: 0.008% or Less

N is present in steel as an unavoidable impurity, N forms AlN by being bonded with Al or forms TiN when Ti is contained and makes crystal grains fine thus enhancing toughness. However, when the content of N exceeds 0.008%, formed nitride becomes coarse so that SSC resistance and toughness are extremely deteriorated. Accordingly, N is limited to 0.008% or less.

Cr: more than 0.6% and 1.7% or Less

Cr is an element which increases strength of steel through enhancing a quenching property and enhances corrosion resistance. Further, Cr forms a carbide such as $M_3C$, $M_7C_3$, $M_{23}C_6$ (M: metal element) by being bonded with C at the time of tempering treatment Accordingly, Cr is an element which enhances tempering softening resistance and, particularly, is an element necessary for enabling a steel pipe to acquire a higher strength. Particularly, an $M_3C$-type carbide exhibits a strong function for enhancing tempering softening resistance. To acquire such an effect, it is necessary that the content of Cr exceeds 0.6%. On the other hand, when the content of Cr exceeds 1.7%, large amounts of $M_7C_3$ and $M_{23}C_6$ are formed, and these compounds function as a trap site for hydrogen and hence, SSC resistance is deteriorated. Accordingly, Cr is limited in a range of more than 0.6% and 1.7% or less, is preferably 0.8 to 1.5%, and is more preferably 0.8 to 1.3%.

Mo: More than 1.0% and 3.0% or Less

Mo is an element which forms carbide and contributes to strengthening steel by precipitation strengthening. At the time of tempering, Mo reduces a dislocation density and enhances SSC resistance, while Mo effectively contributes to the certain acquisition of a desired high strength of steel. Further, Mo becomes in a solid solution state in steel, is segregated in prior austenite grain boundaries, and contributes to the enhancement of SSC resistance. Further, Mo has a function of making a corrosion product dense thus suppressing generation and growth of pits which become initiation points of cracking. To acquire such effects, it is necessary that the content of Mo exceeds 1.0%. On the other hand, when the content of Mo exceeds 3.0%, the formation of acicular $M_2C$ precipitates or, in some cases, the formation of a Laves phase ($Fe_2Mo$) is accelerated so that SSC resistance is deteriorated. Accordingly, the content of Mo is limited in a range of more than 1.0% and 3.0% or less. Mo is preferably more than 1.1% and 3.0% or less, is more preferably more than 1.2% and 2.8% or less, and is further preferably 1.45 to 2.5%. Mo is still further preferably 1.45 to 1.80%.

V: 0.01 to 0.30%

V is an element which forms carbide or carbonitride and contributes to strengthening of steel. To acquire such an effect, the content of V needs to be 0.01% or more. On the other hand, even when the content of V exceeds 0.30%, the effect is saturated so that a further effect corresponding to the further increase in the content of V cannot be expected and hence, it is economically disadvantageous. Accordingly, V is limited to 0.01 to 0.30%, and is preferably in a range of 0.03 to 0.25%.

Nb: 0.001% or more and less than 0.01%

Nb forms carbide or further forms carbonitride, contributes to strengthening steel and also contributes to making austenite grains fine. To acquire such an effect, the content of Nb needs to be 0.001% or more. On the other hand, Nb precipitates easily become a propagation path of SSC (sulfide stress corrosion cracking). The presence of a large amount of Nb precipitates based on the large content of Nb leads to extreme deterioration of SSC resistance particularly in a high-strength steel material having a yield strength of 125 ksi or more. Accordingly, from a viewpoint of acquiring both a desired high strength and excellent SSC resistance, the content of Nb is limited to less than 0.01% in accordance with aspects of the present invention.

B: 0.0003 to 0.0030%

B is segregated in austenite grain boundaries and has a function of enhancing hardenability of steel even when a trace amount of B is contained by suppressing ferrite transformation from grain boundaries. To acquire such an effect, the content of B needs to be 0.0003% or more. On the other hand, when the content of B exceeds 0.0030%, B precipitates as carbonitride or the like, and a quenching property is deteriorated so that toughness is deteriorated. Accordingly, B is limited in a range of 0.0003 to 0.0030%, and is preferably in a range of 0.0005 to 0.0024%.

O (Oxygen): 0.0030% or Less

O (oxygen) is present as an unavoidable impurity and, in steel, is present in the form of oxide-based inclusions. These inclusions become initiation points of SSC and deteriorate SSC resistance. Accordingly, in accordance with aspects of the present invention, it is preferable to decrease the content of O (oxygen) as much as possible. However, the excessive reduction of oxygen leads to pushing up a refining cost and hence, the presence of O up to 0.0030% is permissible. Accordingly, O (oxygen) is limited to 0.0030% or less, and is preferably 0.0020%.

The above-mentioned composition is the basic composition. However, in addition to the basic composition, as selective components, 0.005 to 0.030% Ti and/or one kind or two kinds or more of elements selected from a group consisting of 1.0% or less Cu, 1.00 or less Ni and 3.0% or less W and/or 0.0005 to 0.005% Ca may be contained.

Ti: 0.005% to 0.030%

Ti precipitates as fine TiN by being bonded with N at the time of coagulation of molten steel, and Ti contributes to making austenite grains fine due to its pinning effect. To acquire such an effect, the content of Ti needs to be 0.005% or more. When the content of Ti is less than 0.005%, the effect is small. On the other hand, when the content of Ti exceeds 0.030%, TiN becomes coarse and cannot exhibit the above-mentioned pinning effect and hence, toughness is deteriorated to the contrary. Further, coarse TiN deteriorates SSC resistance. Accordingly, when Ti is contained, Ti is preferably limited in a range of 0.005 to 0.030%.

Ti/N: 2.0 to 5.0

When Ti is contained, Ti/N which is a ratio between the content of Ti and the content of N is adjusted to satisfy a value which falls within a range of 2.0 to 5.0. When Ti/N is less than 2.0, fixing of N becomes insufficient so that a quenching property enhancing effect by B is deteriorated. On the other hand, when Ti/N is large and exceeds 5.0, a tendency for TiN to become coarse remarkably appears so that toughness and SSC resistance are deteriorated. Accordingly, Ti/N is preferably limited in a range of 2.0 to 5.0, and is more preferably 2.5 to 4.5.

One kind or two kinds or more of elements selected from a group consisting of 1.0% or less Cu, 1.0% or less Ni and 3.0% or less W All of Cu, Ni and W are elements which contribute to the increase in strength of steel and hence, one kind or two kinds or more of elements from a group consisting of Cu, Ni, W may be contained when necessary.

Cu is an element which contributes to the increase in strength of steel and, further, has a function of enhancing toughness and corrosion resistance. Particularly, Cu is an element which is extremely effective in enhancing SSC resistance in a severely corrosive environment. When Cu is contained, dense corrosion products are formed so that the corrosion resistance is enhanced, and generation and growth of pits which become initiation points of cracking are suppressed. To acquire such an effect, it is preferable to contain Cu of 0.03% or more. On the other hand, even when the content of Cu exceeds 1.0%, the effect is saturated so that a further effect corresponding to the further increase in the content of Cu cannot be expected and hence, it is economically disadvantageous. Accordingly, when Cu is contained, Cu is preferably limited to 1.0% or less.

Ni is an element which contributes to the increase in strength of steel and, further, enhances toughness and corrosion resistance. To acquire such an effect, it is preferable to contain Ni of 0.03% or more. On the other hand, even when the content of Ni exceeds 1.0%, the effect is saturated so that a further effect corresponding to the further increase in the content of Ni cannot be expected and hence, it is economically disadvantageous. Accordingly, when Ni is contained, Ni is preferably limited to 1.0% or less.

W is an element which forms carbide and contributes to the increase in strength of steel by precipitation strengthening. W is also an element which becomes in a solid solution state, is segregated in prior austenite grain boundaries and contributes to the enhancement of SSC resistance. To acquire such an effect, it is preferable to contain W of 0.03% or more. On the other hand, even when the content of W exceeds 3.0%, the effect is saturated so that a further effect corresponding to the further increase in the content of W cannot be expected and hence, it is economically disadvantageous. Accordingly, when W is contained, W is preferably limited to 3.0% or less.

Ca: 0.0005 to 0.005%

Ca is an element which forms CaS by being bonded with S and effectively functions for a configuration control of sulfide-based inclusions. Ca contributes to the enhancement of toughness and SSC resistance through a configuration control of sulfide-based inclusions. To acquire such an effect, the content of Ca needs to be at least 0.0005%. On the other hand, even when the content of Ca exceeds 0.005%, the effect is saturated so that a further effect corresponding to the further increase in the content of Ca cannot be expected and hence, it is economically disadvantageous. Accordingly, when Ca is contained, Ca is preferably limited in a range of 0.0005 to 0.005%.

The balance other than the above-mentioned components is formed of Fe and unavoidable impurities. As unavoidable impurities, 0.0008% or less Mg and 0.05% or less Co are permissible.

The high-strength seamless steel pipe according to aspects of the present invention has the above-mentioned composition and has the microstructure where a tempered martensitic phase is a main phase and the grain size number of a prior austenite grain is 8.5 or more.

Tempered Martensitic Phase: 95% or More

In the high-strength seamless steel pipe according to aspects of the present invention, to acquire a high strength of 125 ksi class or more YS with certainty and to maintain ductility and toughness necessary for the steel pipe as a construction, a tempered martensitic phase formed by tempering the martensitic phase is set as a main phase. The "main phase" described in this paragraph means that the phase is a single phase where the composition contains 100% of the phase by a volume fraction or the composition contains 95% or more of the phase and 5% or less of a second phase which does not influence properties of the steel pipe. In accordance with aspects of the present invention, a bainitic phase, a retained austenitic phase and pearlite or a mixed phase of these phases can be named as examples of the second phase.

The above-mentioned microstructure in the high-strength seamless steel pipe according to aspects of the present invention can be adjusted by properly selecting a heating temperature at the time of performing quenching treatment and a cooling rate at the time of cooling corresponding to the component of steel.

Grain Size Number of Prior Austenite Grain: 8.5 or More

When the grain size number of the prior austenite grain is less than 8.5, the substructure of generated martensitic phase becomes coarse so that SSC resistance is deteriorated. Accordingly, the grain size number of the prior austenite grain is limited to 8.5 or more. Here, a value measured in accordance with the stipulation of JIS G 0551 is used as the grain size number.

In accordance with aspects of the present invention, the grain size number of the prior austenite grain can be adjusted by changing a heating rate, a heating temperature and a holding time of quenching treatment and the number of quenching treatment times.

The high-strength seamless steel pipe according to aspects of the present invention is a seamless steel pipe where a segregation degree index Ps which is defined by a following formula (1) using $X_M$ which is a ratio between a segregated portion content obtained by performing an area analysis of respective elements by an electron prove micro analyzer (EPMA) in a region having the center thereof positioned at ¼ t (t: wall thickness) from an inner surface of the steel pipe and an average content is set to less than 65.

$$Ps=8.1\ (X_{Si}+X_{Mn}+X_{Mo})+1.2X_P \quad (1)$$

(Here, $X_M$: (segregated portion content (mass %) of element. M)/(average content (mass %) of element M)

The above-mentioned Ps is a value obtained by selecting an element which largely influences SSC resistance when segregation occurs, and is a value introduced so as to indicate a degree of deterioration of SSC resistance due to segregation. With the increase in this value, a locally hardened region is increased and hence, SSC resistance is deteriorated. When the Ps value is less than 65, desired SSC resistance can be acquired. Accordingly, in accordance with aspects of the present invention, the Ps value is limited to less than 65, and is preferably less than 60.

Here, $X_M$ is a ratio between (segregated portion content) and (average content) with respect to the element M, that is, (segregated portion content)/(average content) with respect to the element M. $X_M$ is calculated as follows.

In a square region having sizes of 5 mm×5 mm and having the center thereof at a position ¼ t (t: wall thickness) from an inner surface of a seamless steel pipe, an area analysis is performed in at least three fields of view with respect to an element M (Si, Mn, Mo, P in this embodiment) under a condition of 0.1 seconds per one point with a step of 20 μm by an electron prove micro analyzer (EPMA) using a beam having a diameter of 20 μm. Then, based on the obtained result of the area analysis, with respective to the element M, all acquired concentration values in the measured region are arranged in descending order of concentration, the cumulative occurrence frequency distribution of the content of the element M is obtained, and the content of the element M whose cumulative occurrence frequency becomes 0.0001 is obtained, and the content is set as a segregated portion content of the element M. On the other hand, the content of each element is set as an average content of the element based on the composition (representative value) of each seamless steel pipe.

$X_M$ is a ratio between the above-mentioned segregation portion content and average content of the element M, that is, (segregation portion content)/(average content) of element M.

In accordance with aspects of the present invention, it is necessary to control Ps in a continuous casting step. To be more specific, Ps can be decreased by electromagnetic stirring in a mold and/or a strand.

Next, a method of manufacturing a high-strength seamless steel pipe according to aspects of the present invention is explained.

In the method of manufacturing a high-strength seamless steel pipe according to aspects of the present invention, the steel pipe raw material having the above-mentioned composition is subjected to heating and hot working and, thereafter, is subjected to cooling so that a seamless steel pipe having a predetermined shape is acquired. Then, the seamless steel pipe is subjected to quenching and tempering treatment.

In accordance with aspects of the present invention, it is not particularly necessary to limit the method of manufacturing a steel pipe raw material. However, it is desirable to manufacture a steel pipe raw material such as a billet by making molten steel having the above-mentioned composition by a commonly used melting furnace such as a converter, an electric furnace or a vacuum melting furnace and by forming molten steel into a steel pipe raw material by a continuous casting method or the like.

First of all, a steel raw material having the above-mentioned composition is heated at a heating temperature which falls within a range of 1050 to 1350° C.

Heating Temperature: 1050 to 1350° C.

When the heating temperature is lower than 1050° C., a carbide in the steel pipe raw material is insufficiently dissolved. On the other hand, when the steel pipe raw material is heated at a temperature exceeding 1350° C., crystal grains become coarse and precipitates such as TiN precipitated at the time of coagulation become coarse and also cementite becomes coarse and hence, toughness of the steel pipe is deteriorated. Further, when the steel pipe raw material is heated to a high temperature exceeding 1350° C., a thick scale layer is generated on a surface of the steel pipe raw material, and the thick scale layer causes the generation of surface defects at the time of rolling. Accordingly, also from a viewpoint of saving energy, the heating temperature is limited in a range of 1050 to 1350° C.

Next, hot working is applied to the steel pipe raw material which is heated to the above-mentioned temperature and hence, a seamless steel pipe having a predetermined size and a predetermined shape is formed.

Any hot working method using ordinary seamless steel pipe manufacturing equipment is applicable to hot working in accordance with aspects of the present invention. As ordinary seamless steel pipe manufacturing equipment, seamless steel pipe manufacturing equipment using a Mannesmann-plug mill process or a Mannesmann-mandrel mill process may be named as an example. Further, press-type hot extrusion equipment may be also used for manufacturing a seamless steel pipe. Further, the hot working condition is not particularly limited provided that a seamless steel pipe having a predetermined shape can be manufactured under such a hot working condition. All commonly used hot working conditions can be used.

Cooling After Hot Working: Down to a Surface Temperature of 200° C. or Below at a Cooling Rate of Air Cooling or More In accordance with aspects of the present invention, after the above-mentioned hot working, cooling is applied to an acquired seamless steel pipe until a surface temperature becomes a temperature of 200° C. or below at a cooling rate of air cooling or more. With respect to the composition range according to aspects of the present invention, so long as a cooling rate after hot working is air cooling or more, the microstructure of the seamless steel pipe after cooling can be formed into a microstructure which has a martensitic phase as a main phase. In this case, quenching treatment performed thereafter can be omitted. Accordingly, to finish a martensitic transformation completely, it is necessary to cool the seamless steel pipe down to a surface temperature of 200° C. or below at the above-mentioned cooling rate. When a cooling stop temperature exceeds a surface temperature of 200° C., there may be a case where a martensitic transformation is not finished completely. Accordingly, in cooling the seamless steel pipe after hot working, the seamless steel pipe is cooled down to a surface temperature of 200° C. or below at a cooling rate of air cooling or more. In accordance with aspects of the present invention, "cooling rate of air cooling or more" means 0.1° C./s or more. When the cooling rate is less than 0.1° C./s the metal structure after cooling becomes non-uniform, and the metal structure after subsequent heat treatment becomes non-uniform.

In accordance with aspects of the present invention, as a next step, quenching treatment and tempering treatment are applied to the above-mentioned seamless steel pipe to which cooling after the hot working is applied. There may be a case where microstructure having a martensitic phase as a main phase cannot be acquired by the above-mentioned cooling. Accordingly, to stabilize material quality, quenching treatment and tempering treatment are applied to the seamless steel pipe.

Reheating Temperature for Quenching: $Ac_3$ Transformation Temperature to 1000° C.

In the quenching treatment, the seamless steel pipe is reheated to a temperature which falls within a range of $Ac_3$ transformation temperature or above and 1000° C. or below and, thereafter, rapid cooling treatment is performed until a surface temperature becomes 200° C. or below. When a reheating temperature for quenching is below an $Ac_3$ transformation temperature, heating is not performed to an extent that an austenitic single phase region is formed and hence, the microstructure which has a martensitic phase as a main phase cannot be acquired after quenching. On the other hand, when a reheating temperature is a high temperature exceeding 1000° C., crystal grains become coarse and hence, toughness of a steel pipe is deteriorated. Further, there may be a case where an oxide scale layer on a surface of the steel pipe becomes thick and the oxide scale layer is peeled off thus causing flaws on a surface of the steel pipe. Further, when the reheating temperature exceeds 1000° C., adverse effects such as the increase in a load of a heat treatment furnaces are exerted and, at the same time, excessive energy is required for reheating thus giving rise to a problem from a viewpoint of energy saving. Accordingly, in accordance with aspects of the present invention, a reheating temperature for quenching is limited to a temperature which falls within a range of $Ac_3$ transformation temperature to 1000° C.

Cooling after reheating for quenching is performed by rapid cooling. It is preferable that such cooling is performed by water cooling such that a cooling rate is 2° C./s or above on average at 700 to 400° C. of center temperature obtained by calculation, and a surface temperature is 200° C. or below, preferably, 100° C. or below. Quenching treatment may be performed two times or more.

A value obtained using the following formula is used as an $Ac_3$ transformation temperature.

$$Ac_3 \text{ transformation temperature } (° C.)=937-476.5C+56Si-19.7Mn-16.3Cu-4.9Cr-26.6Ni+38.1Mo+124.8V+136.3Ti+198Al+3315B$$

(Here, C, Si, Mn, Cu, Cr, Ni, Mo, V, Ti, Al, B: Values calculated using contents (mass %) of respective elements are used.) In calculating an $Ac_3$ transformation temperature using the above-mentioned formula, with respect to elements which are not contained in a steel pipe among the elements described in the formula, the calculation is made by setting the contents of the elements to "zero".

Tempering temperature 600 to 740° C.

Tempering treatment is performed so as to enhance toughness and SSC resistance by decreasing dislocation density in the microstructure formed by quenching treatment (including cooling after hot working). In accordance with aspects of the present invention, in tempering treatment, a steel pipe is heated at a temperature (tempering temperature) which falls within a range of 600 to 740° C. It is preferable to perform air cooling treatment after such heating.

When the tempering temperature is below 600° C., the reduction of the dislocation is insufficient so that a steel pipe cannot acquire excellent SSC resistance. On the other hand, when the tempering temperature exceeds 740° C., softening of the microstructure progresses remarkably and hence, a steel pipe cannot acquire a desired high strength.

In accordance with aspects of the present invention, to correct a defective shape of a steel pipe as necessary, shape correction treatment may be performed by warm working or cold working.

EXAMPLES OF THE INVENTION

Hereinafter, the present invention is further explained based on the following examples.

Molten steel having the composition shown in Table 1 was made by a converter, and was formed into slabs by a continuous casting method. The slabs were used as steel pipe raw materials. Electromagnetic stirring was performed in a mold or a strand except for Steel No. Q. Electromagnetic stirring in a mold or a strand was not performed with respect to Steel No. Q. Then, these steel pipe raw materials were charged in a heating furnace, and were heated to a heating temperature shown in Table 2 and were held at the heating temperature (holding time: 2 hours). Then, the heated steel pipe raw materials were formed into pipes using a hot rolling mill of a Mannesmann-plug mill process thus manufacturing seamless steel pipes having sizes described in Table 2 (outer diameter:178.0 to 224.5 mmφ, wall thickness: 15 to 30 mm). After hot working, cooling was performed where the seamless steel pipes were cooled by air to a surface temperature of 200° C. or below shown in Table 2.

After hot working, under conditions shown in Table 2, tempering treatment was further applied to the air-cooled seamless steel pipes. Alternatively, reheating, quenching and tempering treatment were further applied to the air-cooled seamless pipes. After tempering treatment, the seamless steel pipes were air cooled.

Specimens were sampled from the obtained seamless steel pipes, and a microstructure observation, a tensile test and a test on sulfide stress corrosion cracking resistance were carried out on the specimens. The tests were carried out in accordance with the following steps.

(1) Microstructure Observation

Specimens for microstructure observation were sampled from the obtained seamless steel pipes in such a manner that a position which is ¼ t (t: wall thickness) from an inner surface of the pipe on a cross section orthogonal to a pipe axis direction (C cross section) was set as an observation position. The specimens for microstructure observation were polished and were corroded by nital (nitric acid-ethanol mixture), and the microstructures were observed and imaged using an optical microscope (magnification: 1000 times) or a scanning electron microscope (magnification: 2000 to 3000 times). Identification of microstructure and measurement of microstructure fractions were performed by an image analysis using obtained microstructure photographs.

Further, sampled specimens for microstructure observation were polished, and were corroded by picral (picric acid-ethanol mixture) so as to expose prior austenite boundaries. The microstructures were observed and imaged at three or more fields of view or more using an optical microscope (magnification: 1000 times), and grain size numbers were obtained using a cutting method in accordance with JIS G 0551.

With respect to sampled specimens for microstructure observation, in a region having sizes of 5 mm×5 mm and having the center thereof at a position ¼ t (t: wall thickness) from an inner surface of a seamless steel pipe, an area analysis was performed in at least three fields of view with respect to the respective elements Si, Mn, Mo, P under a condition of 0.1 seconds per one point with a step of 20 µm by an electron prove micro analyzer (EPMA) (beam diameter: 20 µm). Then, based on the obtained result of the area analysis, cumulative occurrence frequency distributions of the contents of the respective elements in the measured region were obtained with respect to the respective elements.

Based on the acquired cumulative occurrence frequency distributions, the content which corresponds to cumulative occurrence frequency of 0.0001 was determined with respect to each element, and the content was set as a segregated portion content of the element M (hereinafter also referred as (segregated portion content)$_M$). An analysis result (representative value) of each seamless steel pipe was used as an average content of each element of each seamless steel pipe (hereinafter also referred to as (average content)$_M$).

With respect to the respective obtained seamless steel pipes, a ratio $X_M$ between an obtained segregated portion content of each element and an average content of each element ($X_M$=(segregated portion content)$_M$/(average content)$_M$) was calculated, and a Ps value of each seamless steel pipe was calculated using the following formula (1).

$$Ps=8.1\ (X_{Si}X_{Mn}+X_{Mo})+1.2X_P \qquad (1)$$

(2) Tensile Test

JIS No. 10 specimen for a tensile test (bar specimen: diameter of parallel portion: 12.5 mmφ, length of parallel part: 60 mm, GL: 50 mm) was sampled from an inner surface-side ¼t position (t: wall thickness) of each of the obtained seamless steel pipes according to JIS Z 2241 such that a tensile direction was a pipe axis direction. Using this specimen, the tensile test was performed to obtain tensile characteristics (yield strength YS (0.5% proof stress), tensile strength TS).

(3) Sulfide Stress Corrosion Cracking Test

Rod-like specimens (diameter of parallel portion: 6.35 mmφ, length of parallel portion: 25.4 mm) were sampled from the obtained seamless steel pipes from a region having the center thereof positioned at ¼ t (t: wall thickness) from an inner surface of each steel pipe such that the tube axis direction agrees with the longitudinal direction of the specimen, and the sulfide stress corrosion cracking test was carried out in accordance with a NACE TM0177 Method A. As a test liquid, an aqueous solution of acetic acid-sodium acetate containing an aqueous solution of 5.0 mass % of sodium chloride in which hydrogen sulfide of 10 kPa is saturated and pH is adjusted to 3.5 (liquid temperature: 24° C.) was used. In the test, the rod-like specimen was dipped in the test liquid, and a constant load test where constant load (stress corresponding to 85% of a yield strength) is applied to the specimen for 720 hours was carried out.

The evaluation "○: good" (satisfactory) was given to cases where the specimen was not broken before 720 hours, and the evaluation "X: bad" (unsatisfactory) was given to other cases where the specimen was broken before 720 hours. The sulfide stress corrosion cracking test was not performed on steel pipes which could not obtain a target yield strength (862 MPa) in the tensile test.

The obtained result is shown in Table 3

TABLE 1

| Steel No. | Chemical composition (mass %) | | | | | | | | | | |
|---|---|---|---|---|---|---|---|---|---|---|---|
| | C | Si | Mn | P | S | Al | N | Cr | Mo | V | Nb |
| A | 0.28 | 0.21 | 0.72 | 0.007 | 0.0018 | 0.071 | 0.0031 | 1.49 | 1.59 | 0.077 | 0.006 |
| B | 0.25 | 0.29 | 0.65 | 0.011 | 0.0007 | 0.034 | 0.0034 | 0.89 | 2.26 | 0.078 | 0.002 |
| C | 0.34 | 0.24 | 0.39 | 0.009 | 0.0011 | 0.028 | 0.0055 | 1.32 | 1.87 | 0.055 | 0.005 |
| D | 0.30 | 0.24 | 0.42 | 0.011 | 0.0012 | 0.027 | 0.0035 | 1.22 | 1.95 | 0.034 | 0.003 |
| E | 0.30 | 0.26 | 0.45 | 0.009 | 0.0016 | 0.055 | 0.0028 | 1.06 | 1.73 | 0.019 | 0.007 |
| F | 0.31 | 0.14 | 0.61 | 0.011 | 0.0018 | 0.055 | 0.0033 | 0.97 | 1.54 | 0.045 | 0.005 |
| <u>G</u> | <u>0.18</u> | 0.36 | 0.64 | 0.008 | 0.0014 | 0.034 | 0.0034 | 1.20 | 1.16 | 0.082 | 0.004 |
| <u>H</u> | <u>0.52</u> | 0.12 | 0.38 | 0.011 | 0.0013 | 0.033 | 0.0030 | 1.44 | 1.66 | 0.026 | 0.005 |
| <u>I</u> | 0.27 | 0.25 | 0.45 | 0.009 | 0.0016 | 0.035 | 0.0042 | 1.55 | <u>0.95</u> | 0.054 | 0.006 |
| <u>J</u> | 0.26 | 0.24 | 0.45 | 0.009 | 0.0008 | 0.042 | 0.0042 | <u>0.50</u> | 1.90 | 0.045 | 0.005 |
| <u>K</u> | 0.34 | 0.22 | 0.55 | 0.009 | 0.0011 | 0.042 | 0.0041 | 1.12 | 1.75 | 0.044 | <u>0.017</u> |
| <u>L</u> | 0.34 | 0.25 | 0.75 | 0.011 | 0.0020 | 0.035 | 0.0048 | 1.40 | 1.65 | 0.036 | 0.006 |
| <u>M</u> | 0.35 | 0.25 | 0.75 | 0.012 | 0.0007 | 0.027 | 0.0066 | 1.35 | 1.65 | 0.035 | 0.007 |
| <u>N</u> | 0.32 | 0.26 | 0.75 | 0.012 | 0.0008 | 0.021 | 0.0035 | 1.25 | 1.81 | 0.044 | 0.006 |
| O | 0.27 | 0.13 | 0.62 | 0.005 | 0.0013 | 0.034 | 0.0032 | 0.74 | 1.46 | 0.210 | 0.008 |
| P | 0.26 | 0.23 | 0.55 | 0.010 | 0.0009 | 0.035 | 0.0035 | 0.95 | 1.53 | 0.048 | 0.009 |
| Q | 0.32 | 0.31 | 0.73 | 0.011 | 0.0013 | 0.035 | 0.0041 | 1.12 | 1.76 | 0.020 | 0.008 |

| Steel No. | Chemical composition (mass %) | | | | | | Remarks |
|---|---|---|---|---|---|---|---|
| | B | Ti | Cu, Ni, W | Ca | O | Ti/N | |
| A | 0.0015 | — | — | 0.0015 | 0.0016 | — | Present invention applied example |
| B | 0.0012 | 0.015 | Cu: 0.48 | — | 0.0011 | 4.4 | Present invention applied example |
| C | 0.0009 | 0.023 | — | 0.0018 | 0.0007 | 4.2 | Present invention applied example |
| D | 0.0014 | 0.013 | Ni: 0.51 | — | 0.0008 | 3.7 | Present invention applied example |
| E | 0.0022 | 0.008 | Cu: 0.62, Ni: 0.30 | 0.0016 | 0.0007 | 2.9 | Present invention applied example |
| F | 0.0024 | 0.012 | W: 1.40 | — | 0.0007 | 3.6 | Present invention applied example |
| <u>G</u> | 0.0014 | 0.009 | Ni: 0.32 | 0.0017 | 0.0014 | 2.6 | Comparative example |
| <u>H</u> | 0.0021 | 0.013 | — | — | 0.0009 | 4.3 | Comparative example |
| <u>I</u> | 0.0022 | 0.014 | — | — | 0.0008 | 3.3 | Comparative example |
| <u>J</u> | 0.0014 | 0.015 | — | — | 0.0008 | 3.6 | Comparative example |
| <u>K</u> | 0.0016 | 0.015 | — | — | 0.0007 | 3.7 | Comparative example |
| <u>L</u> | 0.0024 | 0.026 | Cu: 0.25 | — | 0.0011 | <u>5.4</u> | Comparative example |
| <u>M</u> | 0.0011 | 0.012 | Cu: 0.18, Ni: 0.09 | 0.0022 | 0.0018 | <u>1.8</u> | Comparative example |
| <u>N</u> | 0.0019 | 0.015 | Cu: 0.25 | 0.0033 | <u>0.0035</u> | 4.3 | Comparative example |
| O | 0.0022 | — | — | — | 0.0009 | — | Present invention applied example |
| P | 0.0019 | 0.013 | — | — | 0.0008 | 3.7 | Present invention applied example |
| Q | 0.0012 | 0.016 | — | 0.0016 | 0.0012 | 3.9 | Present invention applied example |

Contents other than the above-mentioned contents are Fe and unavoidable impurities as a balance.

TABLE 2

| Steel pipe No. | Steel No. | Heating temperature (°C.) | Pipe size | | Cooling after hot working | | Quenching treatment |
|---|---|---|---|---|---|---|---|
| | | | Outer diameter (mmϕ) | Wall thickness (mm) | Cooling | Cooling stop temperature* (°C.) | Quenching temperature** (°C.) |
| 1 | A | 1250 | 178.0 | 22 | air cooling | <100 | 900 |
| 2 | B | 1250 | 178.0 | 22 | air cooling | <100 | 930 |
| 3 | B | 1250 | 224.5 | 15 | air cooling | <100 | 930 |
| 5 | B | 1250 | 215.9 | 30 | air cooling | <100 | 930 |
| 6 | C | 1250 | 178.0 | 22 | air cooling | <100 | 875 |

TABLE 2-continued

| | | | | | | | | |
|---|---|---|---|---|---|---|---|---|
| 7 | C | 1250 | 178.0 | 22 | air cooling | <100 | 1030 | |
| 8 | D | 1250 | 178.0 | 22 | air cooling | <100 | 920 | |
| 9 | E | 1250 | 178.0 | 22 | air cooling | <100 | 900 | |
| 10 | E | 1250 | 178.0 | 22 | air cooling | <100 | 910 | |
| 11 | E | 1250 | 178.0 | 22 | air cooling | <100 | 880 | |
| 12 | F | 1250 | 178.0 | 22 | air cooling | <100 | 900 | |
| 14 | G | 1250 | 224.5 | 15 | air cooling | <100 | 930 | |
| 15 | H | 1250 | 224.5 | 15 | air cooling | <100 | 900 | |
| 16 | I | 1250 | 224.5 | 15 | air cooling | <100 | 900 | |
| 17 | J | 1250 | 224.5 | 15 | air cooling | <100 | 920 | |
| 18 | K | 1250 | 224.5 | 15 | air cooling | <100 | 930 | |
| 19 | L | 1250 | 224.5 | 15 | air cooling | <100 | 900 | |
| 20 | M | 1250 | 224.5 | 15 | air cooling | <100 | 900 | |
| 21 | N | 1250 | 224.5 | 15 | air cooling | <100 | 900 | |
| 22 | O | 1250 | 178.0 | 22 | air cooling | <100 | 915 | |
| 23 | P | 1230 | 178.0 | 25 | air cooling | <100 | 920 | |
| 24 | Q | 1230 | 178.0 | 25 | air cooling | <100 | 900 | |

| Steel pipe No. | Quenching treatment Cooling stop temperature*** (° C.) | Tempering treatment Tempering temperature (° C.) | $Ac_3$ transformation temperature (° C.) | Remarks |
|---|---|---|---|---|
| 1 | 150 | 700 | 883 | Present invention example |
| 2 | 150 | 700 | 918 | Present invention example |
| 3 | <100 | 710 | 918 | Present invention example |
| 5 | <100 | 700 | 918 | Present invention example |
| 6 | <100 | 710 | 864 | Present invention example |
| 7 | <100 | 710 | 864 | Comparative example |
| 8 | <100 | 700 | 870 | Present invention example |
| 9 | <100 | 680 | 864 | Present invention example |
| 10 | <100 | 760 | 864 | Comparative example |
| 11 | 325 | 665 | 864 | Comparative example |
| 12 | <100 | 700 | 865 | Present invention example |
| 14 | <100 | 680 | 908 | Comparative example |
| 15 | <100 | 685 | 763 | Comparative example |
| 16 | <100 | 690 | 865 | Comparative example |
| 17 | <100 | 710 | 908 | Comparative example |
| 18 | <100 | 700 | 858 | Comparative example |
| 19 | <100 | 700 | 849 | Comparative example |
| 20 | <100 | 700 | 835 | Comparative example |
| 21 | <100 | 710 | 861 | Comparative example |
| 22 | <100 | 695 | 897 | Present invention example |
| 23 | <100 | 685 | 890 | Present invention example |
| 24 | <100 | 700 | 864 | Comparative example |

*Temperature when air cooling is finished: surface temperature
**Reheating temperature
***Quenching cooling stop temperature: surface temperature

TABLE 3

| Steel pipe No. | Steel No. | Ps value | Microstructure Kind* | Microstructure TM fraction (volume %) | Prior γ grain size number | Tensile characteristic Yield strength YS (MPa) | Tensile characteristic Tensile strength TS (MPa) | SSC resistance | Remarks |
|---|---|---|---|---|---|---|---|---|---|
| 1 | A | 58.2 | TM + B | 98 | 10.5 | 880 | 968 | ○: good | Present invention example |
| 2 | B | 54.4 | TM + B | 98 | 10.0 | 873 | 970 | ○: good | Present invention example |
| 3 | B | 55.0 | TM + B | 98 | 10.5 | 866 | 949 | ○: good | Present invention example |
| 5 | B | 41.4 | TM + B | 98 | 10.5 | 889 | 982 | ○: good | Present invention example |
| 6 | C | 48.5 | TM + B | 98 | 10.5 | 925 | 997 | ○: good | Present invention example |
| 7 | C | 47.2 | TM + B | 99 | 8.0 | 942 | 1019 | X: bad | Comparative example |
| 8 | D | 48.5 | TM + B | 98 | 10.5 | 997 | 1034 | ○: good | Present invention example |
| 9 | E | 47.4 | TM + B | 98 | 10.5 | 938 | 1013 | ○: good | Present invention example |
| 10 | E | 44.3 | TM + B | 98 | 10.5 | 828 | 916 | — | Comparative example |
| 11 | E | 53.2 | TM + B | 80 | 10.5 | 806 | 896 | — | Comparative example |
| 12 | F | 54.2 | TM + B | 98 | 10.5 | 928 | 1009 | ○: good | Present invention example |
| 14 | G | 59.9 | TM + B | 98 | 10.5 | 815 | 899 | — | Comparative example |
| 15 | H | 73.2 | TM + B | 98 | 10.5 | 1094 | 1164 | X: bad | Comparative example |
| 16 | I | 71.0 | TM + B | 98 | 10.5 | 998 | 1039 | X: bad | Comparative example |
| 17 | J | 72.5 | TM + B | 98 | 10.5 | 986 | 1060 | X: bad | Comparative example |
| 18 | K | 62.3 | TM + B | 96 | 10.5 | 864 | 986 | X: bad | Comparative example |
| 19 | L | 69.6 | TM + B | 98 | 10.5 | 978 | 1034 | X: bad | Comparative example |
| 20 | M | 68.2 | TM + B | 98 | 9.5 | 878 | 986 | X: bad | Comparative example |
| 21 | N | 70.2 | TM + B | 98 | 10.5 | 868 | 941 | X: bad | Comparative example |

TABLE 3-continued

| Steel pipe No. | Steel No. | Ps value | Kind* | Microstructure TM microstructure fraction (volume %) | Prior γ grain size number | Tensile characteristic Yield strength YS (MPa) | Tensile strength TS (MPa) | SSC resistance | Remarks |
|---|---|---|---|---|---|---|---|---|---|
| 22 | O | 54.4 | TM + B | 98 | 11.5 | 877 | 921 | ○: good | Present invention example |
| 23 | P | 50.5 | TM + B | 98 | 9.5 | 912 | 980 | ○: good | Present invention example |
| 24 | Q | 68.9 | TM + B | 98 | 9.5 | 933 | 1022 | X: bad | Comparative example |

*TM: tempered martensite/B: bainite

In all of the present invention examples, high strength of a yield strength YS of 862 MPa (125 ksi) or more was maintained, and cracks did not occur even when a stress which is 85% of a yield strength was applied to the specimen for 720 hours in an aqueous solution of acetic acid-sodium acetate containing an aqueous solution of 5.0 mass % of salt in which hydrogen sulfide of 10 kPa is saturated and pH is adjusted to 3.5 (liquid temperature: 24° C.). Accordingly, all of the present invention examples provide each high-strength seamless steel pipe having excellent sulfide stress corrosion cracking resistance. On the other hand, in the comparative examples whose range is outside the range of the present invention examples, desired high strength cannot be secured or SSC resistance is deteriorated.

With respect to Steel pipe No. 7, the quenching temperature is a high temperature exceeding 1,000° C. so that prior austenite grains become coarse and SSC resistance property is deteriorated. With respect to Steel pipe No. 10, the tampering temperature exceeds the upper limit in the range according to aspects of the present invention, failing to secure desired high strength. With respect to Steel pipe No. 11, the cooling stop temperature for quenching is lower than the lower limit in the range according to aspects of the present invention so that a desired microstructure where a martensitic phase forms a main phase cannot be obtained, failing to secure desired high strength. With regard to Steel pipe No. 14, the content of C is lower than the lower limit in the range according to aspects of the present invention so that predetermined high strength cannot be secured. With respect to Steel pipe No. 15, the content of C exceeds the upper limit in the range according to aspects of the present invention and the Ps value of Steel pipe No. 15 also becomes 65 or more so that SSC resistance is deteriorated. With respect to Steel pipe No. 16, the content of Mo is lower than the lower limit in the range according to aspects of the present invention and the Ps value of Steel pipe No. 16 also becomes 65 or more so that SSC resistance is deteriorated. With respect to Steel pipe No. 17, the content of Cr is lower than the lower limit in the range according to aspects of the present invention and the Ps value of Steel pipe No. 17 also becomes 65 or more so that SSC resistance is deteriorated. With respect to Steel pipe No. 18, the content of Nb exceeds the upper limit in the range according to aspects of the present invention and the Ps value of Steel pipe No. 18 also becomes 65 or more so that SSC resistance is deteriorated. With respect to Steel pipe No. 19, Ti/N exceeds the upper limit in the range according to aspects of the present invention and the Ps value of Steel pipe No. 19 also becomes 65 or more so that SSC resistance is deteriorated. With respect to Steel pipe No. 20, Ti/N is lower than the lower limit in the range according to aspects of the present invention and the Ps value of Steel pipe No. 20 becomes 65 or more so that SSC resistance is deteriorated. With respect to Steel pipe No. 21, the amount of oxygen exceeds the upper limit in the range according to aspects of the present invention and the Ps value of Steel pipe No. 21 becomes 65 or more, deteriorating SSC resistance. With respect to Steel pipe No. 24, while the component is suitable, because electromagnetic stirring is not carried out in a continuous casting process the Ps value of Steel pipe No. 24 becomes 65 or more and SSC resistance is deteriorated.

The invention claimed is:

1. A high-strength seamless steel pipe for an oil country tubular goods having the composition which contains, by mass %, 0.20 to 0.50% C, 0.05 to 0.40% Si, 0.3 to 0.9% Mn, 0.015% or less P, 0.005% or less S, 0.005 to 0.1% Al, 0.008% or less N, more than 0.6% and 1.7% or less Cr, more than 1.0% and 3.0% or less Mo, 0.01 to 0.30% V, 0.001% or more and less than 0.01% Nb, 0.0003 to 0.0030% B, 0.0030% or less O (oxygen), and Fe and unavoidable impurities as a balance, wherein
the steel pipe has the microstructure where a volume fraction of a tempered martensitic phase is 95% or more, and prior austenitic grains have a grain size number of 8.5 or more, and a segregation degree index Ps which is defined by a following formula (1) using $X_M$ which is a ratio between a segregated portion content obtained by performing an area analysis of respective elements by an electron probe micro analyzer (EPMA) in a region having the center thereof positioned at ¼ t(t: wall thickness) from an inner surface of the steel pipe and an average content is set to less than 65, and a yield strength YS is 866 MPa or more,
wherein $$Ps = 8.1(X_{Si} + X_{Mn} + X_{Mo}) + 1.2X_P \tag{1}$$

where $X_M$: (segregated portion content (mass %) of element M)/(average content (mass %) of element M).

2. The high-strength seamless steel pipe for an oil country tubular goods according to claim 1, wherein the composition further contains, by mass %, 0.005% to 0.030% Ti such that Ti/N which is a ratio between the content of Ti and the content of N is set to a value which falls within a range of 2.0 to 5.0.

3. The high-strength seamless steel pipe for an oil country tubular goods according to claim 1, wherein the composition further contains one kind or two kinds or more of elements selected from the group consisting of, by mass %, 1.0% or less Cu, 1.0% or less Ni, and 3.0% or less W.

4. The high-strength seamless steel pipe for an oil country tubular goods according to claim 2, wherein the composition further contains one kind or two kinds or more of elements selected from the group consisting of, by mass %, 1.0% or less Cu, 1.0% or less Ni, and 3.0% or less W.

5. The high-strength seamless steel pipe for an oil country tubular goods according to claim 1, wherein the composition further contains 0.0005 to 0.005% Ca by mass %.

6. The high-strength seamless steel pipe for an oil country tubular goods according to claim 2, wherein the composition further contains 0.0005 to 0.005% Ca by mass %.

7. The high-strength seamless steel pipe for an oil country tubular goods according to claim 3, wherein the composition further contains 0.0005 to 0.005% Ca by mass %.

8. The high-strength seamless steel pipe for an oil country tubular goods according to claim 4, wherein the composition further contains 0.0005 to 0.005% Ca by mass %.

9. A method of manufacturing a high-strength seamless steel pipe for an oil country tubular goods which is a method of manufacturing a seamless steel pipe having a predetermined shape by applying heating and hot working to a steel pipe material, and which is a method of manufacturing the high-strength seamless steel pipe for an oil country tubular goods according to claim 1, wherein
a heating temperature in the heating is set to a temperature which falls within a range of 1050 to 1350° C., cooling after the above-mentioned hot working is performed such that the cooling is performed until a surface temperature becomes a temperature equal to or below 200° C. at a cooling rate equal to or higher than air cooling and, after the cooling, quenching treatment in which the steel pipe is reheated at a temperature which falls within a range of $A_{c3}$ transformation temperature or above to 1000° C. or below and the steel pipe is cooled to a temperature such that a surface temperature becomes 200° C. or below is performed one time or more, and after the quenching treatment, tempering treatment which heats the steel pipe to a temperature which falls within a range of 600 to 740° C. is performed.

10. A method of manufacturing a high-strength seamless steel pipe for an oil country tubular goods which is a method of manufacturing a seamless steel pipe having a predetermined shape by applying heating and hot working to a steel pipe material, and which is a method of manufacturing the high-strength seamless steel pipe for an oil country tubular goods according to claim 2, wherein
a heating temperature in the heating is set to a temperature which falls within a range of 1050 to 1350° C., cooling after the above-mentioned hot working is performed such that the cooling is performed until a surface temperature becomes a temperature equal to or below 200° C. at a cooling rate equal to or higher than air cooling and, after the cooling, quenching treatment in which the steel pipe is reheated at a temperature which falls within a range of $A_{c3}$ transformation temperature or above to 1000° C. or below and the steel pipe is cooled to a temperature such that a surface temperature becomes 200° C. or below is performed one time or more, and after the quenching treatment, tempering treatment which heats the steel pipe to a temperature which falls within a range of 600 to 740° C. is performed.

11. A method of manufacturing a high-strength seamless steel pipe for an oil country tubular goods which is a method of manufacturing a seamless steel pipe having a predetermined shape by applying heating and hot working to a steel pipe material, and which is a method of manufacturing the high-strength seamless steel pipe for an oil country tubular goods according to claim 3, wherein
a heating temperature in the heating is set to a temperature which falls within a range of 1050 to 1350° C., cooling after the above-mentioned hot working is performed such that the cooling is performed until a surface temperature becomes a temperature equal to or below 200° C. at a cooling rate equal to or higher than air cooling and, after the cooling, quenching treatment in which the steel pipe is reheated at a temperature which falls within a range of $A_{c3}$ transformation temperature or above to 1000° C. or below and the steel pipe is cooled to a temperature such that a surface temperature becomes 200° C. or below is performed one time or more, and after the quenching treatment, tempering treatment which heats the steel pipe to a temperature which falls within a range of 600 to 740° C. is performed.

12. A method of manufacturing a high-strength seamless steel pipe for an oil country tubular goods which is a method of manufacturing a seamless steel pipe having a predetermined shape by applying heating and hot working to a steel pipe material, and which is a method of manufacturing the high-strength seamless steel pipe for an oil country tubular goods according to claim 4, wherein
a heating temperature in the heating is set to a temperature which falls within a range of 1050 to 1350° C., cooling after the above-mentioned hot working is performed such that the cooling is performed until a surface temperature becomes a temperature equal to or below 200° C. at a cooling rate equal to or higher than air cooling and, after the cooling, quenching treatment in which the steel pipe is reheated at a temperature which falls within a range of $A_{c3}$ transformation temperature or above to 1000° C. or below and the steel pipe is cooled to a temperature such that a surface temperature becomes 200° C. or below is performed one time or more, and after the quenching treatment, tempering treatment which heats the steel pipe to a temperature which falls within a range of 600 to 740° C. is performed.

13. A method of manufacturing a high-strength seamless steel pipe for an oil country tubular goods which is a method of manufacturing a seamless steel pipe having a predetermined shape by applying heating and hot working to a steel pipe material, and which is a method of manufacturing the high-strength seamless steel pipe for an oil country tubular goods according to claim 5, wherein
a heating temperature in the heating is set to a temperature which falls within a range of 1050 to 1350° C., cooling after the above-mentioned hot working is performed such that the cooling is performed until a surface temperature becomes a temperature equal to or below 200° C. at a cooling rate equal to or higher than air cooling and, after the cooling, quenching treatment in which the steel pipe is reheated at a temperature which falls within a range of $A_{c3}$ transformation temperature or above to 1000° C. or below and the steel pipe is cooled to a temperature such that a surface temperature becomes 200° C. or below is performed one time or more, and after the quenching treatment, tempering treatment which heats the steel pipe to a temperature which falls within a range of 600 to 740° C. is performed.

14. A method of manufacturing a high-strength seamless steel pipe for an oil country tubular goods which is a method of manufacturing a seamless steel pipe having a predetermined shape by applying heating and hot working to a steel pipe material, and which is a method of manufacturing the high-strength seamless steel pipe for an oil country tubular goods according to claim 6, wherein
a heating temperature in the heating is set to a temperature which falls within a range of 1050 to 1350° C., cooling after the above-mentioned hot working is performed such that the cooling is performed until a surface temperature becomes a temperature equal to or below 200° C. at a cooling rate equal to or higher than air cooling and, after the cooling, quenching treatment in which the steel pipe is reheated at a temperature which falls within a range of $A_{c3}$ transformation temperature or above to 1000° C. or below and the steel pipe is cooled to a temperature such that a surface temperature becomes 200° C. or below is performed one time or more, and after the quenching treatment, tempering treatment which heats the steel pipe to a temperature which falls within a range of 600 to 740° C. is performed.

15. A method of manufacturing a high-strength seamless steel pipe for an oil country tubular goods which is a method of manufacturing a seamless steel pipe having a predetermined shape by applying heating and hot working to a steel pipe material, and which is a method of manufacturing the high-strength seamless steel pipe for an oil country tubular goods according to claim 7, wherein a heating temperature in the heating is set to a temperature which falls within a range of 1050 to 1350° C., cooling after the above-mentioned hot working is performed such that the cooling is performed until a surface temperature becomes a temperature equal to or below 200° C. at a cooling rate equal to or higher than air cooling and, after the cooling, quenching treatment in which the steel pipe is reheated at a temperature which falls within a range of $A_{c3}$ transformation temperature or above to 1000° C. or below and the steel pipe is cooled to a temperature such that a surface temperature becomes 200° C. or below is performed one time or more, and after the quenching treatment, tempering treatment which heats the steel pipe to a temperature which falls within a range of 600 to 740° C. is performed.

16. A method of manufacturing a high-strength seamless steel pipe for an oil country tubular goods which is a method of manufacturing a seamless steel pipe having a predetermined shape by applying heating and hot working to a steel pipe material, and which is a method of manufacturing the high-strength seamless steel pipe for an oil country tubular goods according to claim 8, wherein a heating temperature in the heating is set to a temperature which falls within a range of 1050 to 1350° C., cooling after the above-mentioned hot working is performed such that the cooling is performed until a surface temperature becomes a temperature equal to or below 200° C. at a cooling rate equal to or higher than air cooling and, after the cooling, quenching treatment in which the steel pipe is reheated at a temperature which falls within a range of $A_{c3}$ transformation temperature or above to 1000° C. or below and the steel pipe is cooled to a temperature such that a surface temperature becomes 200° C. or below is performed one time or more, and after the quenching treatment, tempering treatment which heats the steel pipe to a temperature which falls within a range of 600 to 740° C. is performed.

* * * * *